P. PANOULIAS.
COATING AND STROKING OR DECORATING MACHINE.
APPLICATION FILED AUG. 3, 1911.

1,352,686.

Patented Sept. 14, 1920.
5 SHEETS—SHEET 3.

UNITED STATES PATENT OFFICE.

PANAYIOTIS PANOULIAS, OF NEW YORK, N. Y.

COATING AND STROKING OR DECORATING MACHINE.

1,352,686.  Specification of Letters Patent.  Patented Sept. 14, 1920.

Application filed August 3, 1911. Serial No. 642,090.

*To all whom it may concern:*

Be it known that I, PANAYIOTIS PANOULIAS, a subject of the King of Greece, residing at New York city, in the county of New York and State of New York, have invented certain new and useful Improvements in Coating and Stroking or Decorating Machines, of which the following is a clear, full, and exact description.

The invention comprises a combined machine for coating and stroking confectionery cores and the like, the object being to coat the cores and thereupon stroke the same in a superior manner. This end is attained by a novel organization of devices and by improvements in various features not necessarily confined in their use to the mechanism as an entirety, all of which will now be described and more particularly pointed out in the appended claims.

The coating means embodied herein is of the flooding type, such as disclosed in my Patent No. 685,790, dated November 5, 1901, and the stroking device employed is preferably of the kind covered generically by my Patent No. 663,359, dated December 4, 1900, improvements whereon have been patented to me numbered 707,864 of August 25, 1902, 809,737 of January 9, 1906, 855,804 of June 4, 1907, and 1,148,793 of August 3, 1915.

In the present invention these instrumentalities are combined in one mechanical organism, with endless traveling core supporting means by which the cores are carried under the flow and thence, before their freshly-formed coats have hardened and while resting on the core supporting means, to positions where they are decorated by the stroking means, which latter may be and preferably is operated automatically to perform the stroke directly or indirectly from the source of power driving the core support, whereby the cores after being placed on the support are coated and then stroked, with economy of apparatus and space and increase in output and under conditions favoring the production of a superior quality of goods.

The stroking means is essentially a transverse device comprising individual stroking portions or members adapted to contact with a freshly coated row of cores before the commencement of the stroking operation, which is produced by raising the stroking device so as to draw from each core a string and by causing relative movement between the device and the cores so that the strings are deposited upon the tops of the latter. Strokes made in this way have the desired appearance of originating in the coatings rather than of being purely applied; and as in my prior patents the decorations are preferably formed partly from material lifted from the coatings on the cores and partly from added material supplied by the stroking devices, for which purpose the contacting portions of the stroking device are preferably in the form of spoons or cups. In the present invention the spoons or contacting portions operate upon the cores while the same rest upon a conveyer or traveling core support, means preferably of an automatic character being provided for moving the spoons upward at the proper times to draw therefrom the strings, which break and fall upon the pieces to form the decorations. In order to place a decoration across each piece, the combination of a vertically movable stroking device and a horizontally movable conveyer is sufficient, but as herein illustrated, I may also move the spoons horizontally or across the cores when in their elevated positions, whereby the strokes may be formed wholly during periods of rest of the conveyer or whereby fancy decorations may be produced.

The endless core support, it is to be noted, travels intermittently or in a step-by-step manner. This mode of drive offers advantages with respect to both the coating and stroking operations. Thus the cores may be coated during a period of rest of the conveyer, permitting of the use of a smaller stream or streams of coating material and more precise and effective control of the operation than would be possible if the cores were coated while in motion. It also becomes possible to have the stroking means perform its operation or the first part thereof while the cores and the conveyer are stationary, in this way obtaining better decorations than may be produced by separating the spoons from the cores to draw the strings while the cores are in transit. Obviously this condition is fulfilled whether the conveyer remains stationary throughout the stroke or whether it moves as soon as the spoons have been raised clear of the cores. In the former instance it is necessary to carry the stroking spoons backward over the cores in order to deposit the strings across the same; in the latter case the same result is secured by the forward movement of the conveyer following the raising of the stroking device. The particular timing of the operations is, of course, a matter of appropriate proportioning and adjustment, and in the construction illustrated may be readily varied by changing the setting of a shiftable element in the train of driving connections.

In the preferred embodiment of the invention herein illustrated a series of the stroking devices are provided, and instead of having only such movement as is necessary to form and apply the decorations, are mounted and driven so as to travel in a circuit, the working stretch of which is over and parallel with the working stretch of the conveyer. In the said embodiment, moreover, the drive of the chain of stroking devices is intermittent like that of the conveyer and substantially equal or slightly less in speed. This construction while not necessarily essential has certain advantages, more particularly that the spoons may be in contact with and steadying the cores while the latter are being coated, and remain in contact up to the time when they are moved upward to draw the decorating strings and form the stroke. The arrangement also permits the spoons to be carried beneath the flooding outlet of the elevated coating receptacle or hopper, in order to receive coating material therefrom; but as far as this feature is concerned of supplying the stroking devices from the same source as the downward flow wherein the cores are coated, it will be apparent to those skilled in the art that other equivalent arrangements may be resorted to with equal effect.

A special feature of the invention relates to the agitation of the core support, which has been found most important in coating machines of the flooding type, and which was disclosed in my Patent 685,790 aforesaid. The agitation of the cores during and after flooding is of great value in securing a uniform, unbroken coat of good color and texture, without feet or wire marks, but would be a detriment to the stroking operation because the stroking devices cannot properly perform their function if the cores are in agitation while being decorated. Accordingly I provide means whereby the endless core support is agitated in a part of its working stretch which includes the coating region, but is held against agitation at the region where the stroking takes place.

Another feature affecting more particularly the stroking or decorating function is the provision of means whereby the stroking devices or spoons, which, as heretofore stated, are adapted to hold additional coating material to form or partly form the strings, are jarred, vibrated, or agitated while in action, so as to cause the material to descend and to prevent premature breaking of the strings, whereby decorations of substantial length may be produced.

Still another feature of the invention aims to prevent misplacement of the decorations on the pieces and comprises guides which are disposed in such manner as to confine the cores laterally both while being coated and agitated and later while being stroked, thus positively insuring alinement of the cores with the stroking devices.

These and other features of the invention will become apparent as the specification proceeds and will be more particularly pointed out in the claims. While the invention comprises a machine organized both to coat and stroke, it will be understood that certain features in connection with the decoration of the pieces are not necessarily limited to coating, and conversely certain features in respect to the coating are not necessarily dependent upon the stroking.

In the accompanying drawings I have shown a specific embodiment of my invention hereinafter described.

In the accompanying drawings.

As shown in the drawings.

Figures 5, 6:
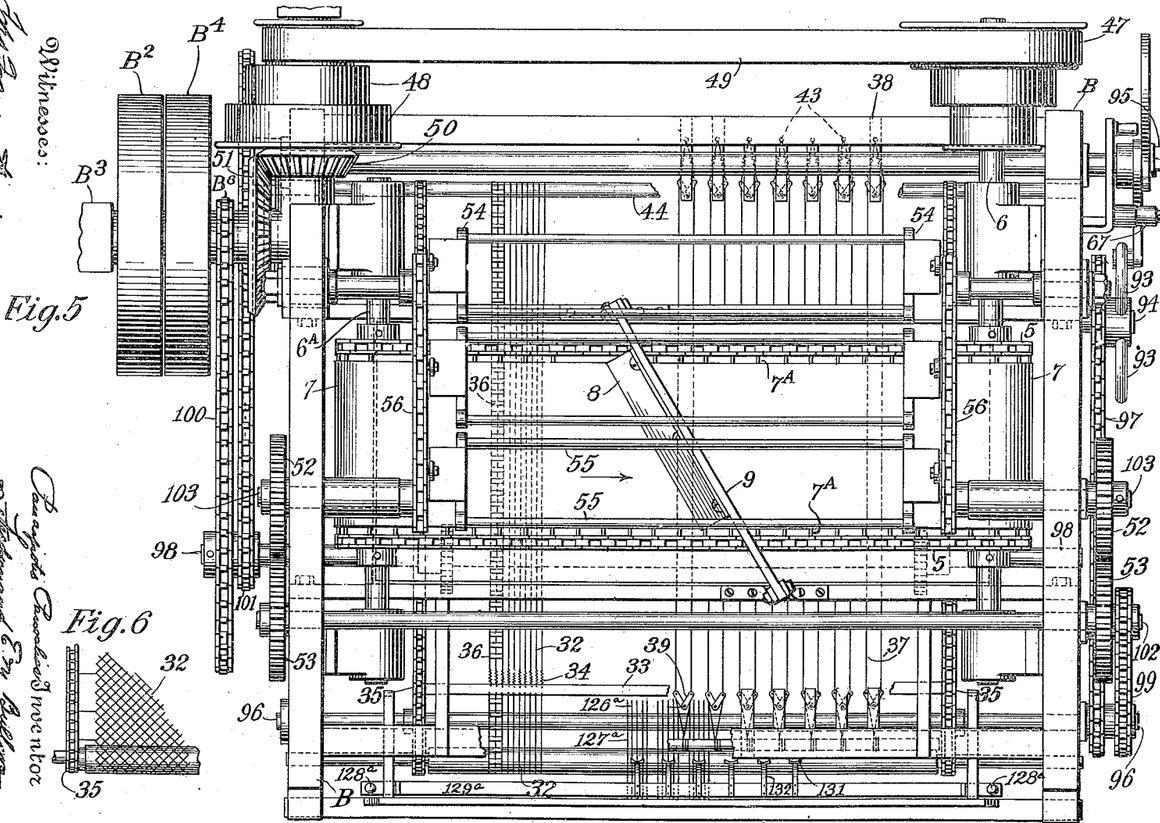
Fig. 5 is a plan view of my specific form of machine.
Fig. 6 is a portion of one construction of the core support.
Figure 11:
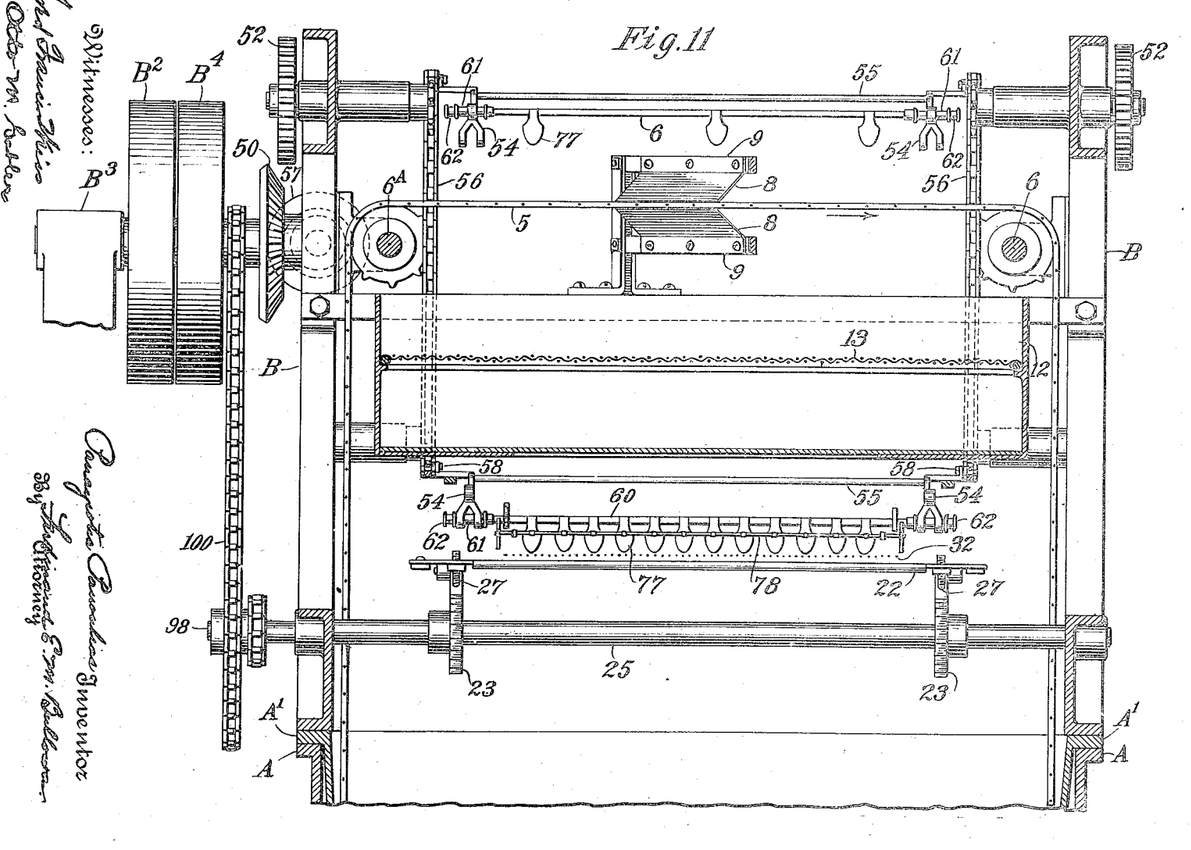
Fig. 11 is a front elevation showing the stroking or decorating mechanism in position for the coating operation.

My improved machine includes an outer tank A containing the coating material receptacle A¹, and an outer frame B, surrounding the mechanism above the receptacle A, there being a space C between the outer tank A and the coating material receptacle A¹ for the purpose of holding water or other substance to regulate the temperature of the coating material. A² are the supports on which the entire machine rests. A³ designates the means for withdrawing the coating material from the receptacle A¹. In the coating material receptacle A¹ I provide shafts A⁴ attached at their ends to suitable bearings on the inner surface thereof to guide the material conveyer 7 hereinafter described through the coating material. The chains 5—5 by and between which the material conveyer 7 is carried, pass at the bottom beneath sprockets on these shafts and at the top over sprockets 10, which latter are secured by pins 11 to the shafts 6 and 6ᵃ, located adjacent opposite sides of the upper part of the machine. 7ᵃ are cross bars held by the chains 5—5 and extending transversely through the material conveyer 7 to support and stiffen the latter. 8, 8, are scrapers held by the bars 9, 9, to discharge the coating material from the surfaces of the conveyer into the hopper 12, suspended from bars 14 and having in its bottom an opening or openings 15 closed by a plate 17 having openings 16. As shown in Fig. 11, the scrapers 8, 8 are disposed between the shafts 6 and 6ᵃ, and engage the conveyer 5 on both sides thereof, so as to scrape therefrom the material adhering to both sides thereof. The material from the hopper may be distributed through a perforated plate or screen instead of through the openings 15 of the hopper and the openings 16 of the plate 17. I also place a screen 13 in the hopper 12. The blower placed over the core support 32 (more particularly hereinafter described) has an inlet 18, a chute 19, a discharge outlet 20 and an adjustable means 21 for regulating the flow of air. The blower serves the purpose not only of removing bubbles and wrinkles which form upon the cores but by means of its adjustable means 21 regulates the flow of air on to the spaced plates 36 carried by the conveyer, preferably at the sides thereof thereby agitating the core support when it is not desirable to use the agitator frame which is also provided. Vibration is transmitted from the plates 36 to the various portions of the conveyer by means of cross-connections, of which one, namely the bar 33, is illustrated in Fig. 5; or, as indicated in Fig. 6, the conveyer may be formed of crossing strands of wire, whereby vibration is transmitted throughout its transverse extent. Said agitator frame which is used when heavy coating material is used and a heavy coating is desired is composed of an agitator arm 24 which ends in a plate 22 operated by ratchets 23 fixed on a revolving shaft 25. Said agitator frame is also provided with dogs 26 and set screws 27 to adjust the agitation. The agitator arm 24 is at the end thereof opposite the plate 22 secured to an arm 29 pivoted on the bars 30 by means of the pin 28. Said agitator frame has cross bars 24ᵈ which come in contact with the core support 32, thus agitating the same. By removing said cross-bars, the agitation of the core-support 32 is prevented, without interfering with the action of the plate 22 in pushing up the coating material against the bottoms of the cores. The agitation of the plate 22 causes the coating material which falls upon it to be pushed up against the bottoms of the cores thus thoroughly coating them.

In order to regulate the agitation of the core support so that it may be agitated in part and held against agitation in another part I provide one or more rollers 31, located at a height above the plane of the core support 32, and revoluble on a shaft 31ᵃ disposed between and carried by the bars 30, at the top thereof. The core support 32 is preferably constructed of wires or other similar flexible material having one or more springs 34 throughout their length fastened to a bar or bars 33, the entire support being moved by chains 35 or other similar means passing around the rollers 44, 45 and 46 around which said wires 32 also pass.

Figure 15:
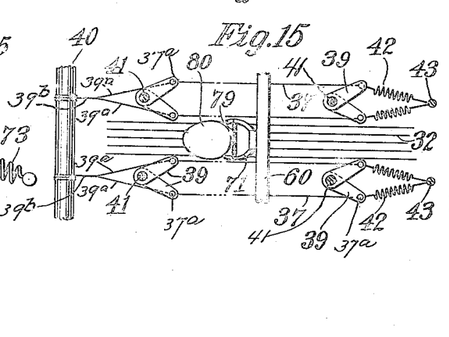
Fig. 15 is an enlarged view of the spacing mechanism which is placed over the core support.

In order to obviate the difficulties experienced by reason of the misplacement of cores during agitation I provide the spacing device 37. This device preferably comprises a plurality of parallel wires extending lengthwise over the conveyer 32 and spaced apart at suitable distances to confine the cores to the desired lines of travel. Means are provided for regulating this spacing, and to this end I preferably secure the wires adjacent their opposite ends to pins forming parts of obliquely disposed fingers 39 which are mounted by pivots 41 on stationary parts 38 of the machine. The fingers 39 at one end are connected by springs 42 with stationary pins or anchorages 43, while those at the opposite end are connected by continuations of the guide wires with a winding shaft 40. As will be apparent from Fig. 15 the springs 42 tend to swing the fingers 39 in one direction while the winding shaft 40 may be operated to swing them in the reverse direction, the result of the movement of the pivoted fingers being to cause the opposite sides of the guide channels defined by the wires 37 to be spaced nearer or farther apart, as the case may be. It will be understood, of course, that suitable means are provided for normally holding the winding shaft against turning backward under the pull of the springs.

The stroking or decorating mechanism is carried by a guide frame comprising brackets 54—54, adjacent opposite sides of the machine. These brackets are united in pairs by transverse rods 55 and are suspended from chains 56 with freedom for swinging movement, by means of pivots 58, which latter hingedly unite lugs 57 on certain links of the chain with extensions 59 on the tops of the brackets 54—54. The guide frame carries stroking devices, preferably in the nature of spoons or mechanical thumbs 77, which are fastened to bars 60, on the ends of which are fixed cylindrical sleeves 61 to operate in the slots 54$^b$ of the brackets 54, the extremities of these cylindrical portions being formed with grooved collars 62 adapted to pass through actuating guides 63. These cam guides are carried at the otherwise free extremities of arms 66$^a$ which are pivoted at their other extremities, as at 65, to collars 71 fast on the shaft 64 rotatably mounted in plates 72, 72 carried by the machine side-frames B, B. These pivots permit of sidewise movement of the spoons if desired. When the decorating operation is to be performed automatically the cam 68 moves the handle 66 which carries the roller 67. The cam 68 has one or more projections or teeth 69 which by engagement with the roller 67 push the cam guides 63—63 upward raising and lowering the bar 60 to which the spoons or mechanical thumbs 77 are attached. By thus raising and dropping the spoons through a short distance at the time of effecting the stroke the material in the spoons is compelled to descend to enter into the composition of the strings which the spoons draw from the coatings on the cores. In this way strong strings are produced and premature breaking thereof is avoided, so that decorations of any desired extent may be produced. Manifestly the jarring or vibration of the spoons while in the act of stroking may be prolonged by multiplying the number of projections 69, or the effect may be produced by other equivalent mechanical devices. Upon the further rotation of the shaft 95 the long finger 70 bears against the roller 67 and raises the latter and the spoons upward sufficiently to clear the tops of the candies. Depending upon the formation of the finger or cam 70, the spoons may be merely moved upward, or in addition may also be carried in their elevated positions horizontally across the tops of the candies, as permitted by the horizontal portions of the slots 54$^b$, this movement being contrary to the direction of conveyer travel.

Figures 7, 8, 9, 10:
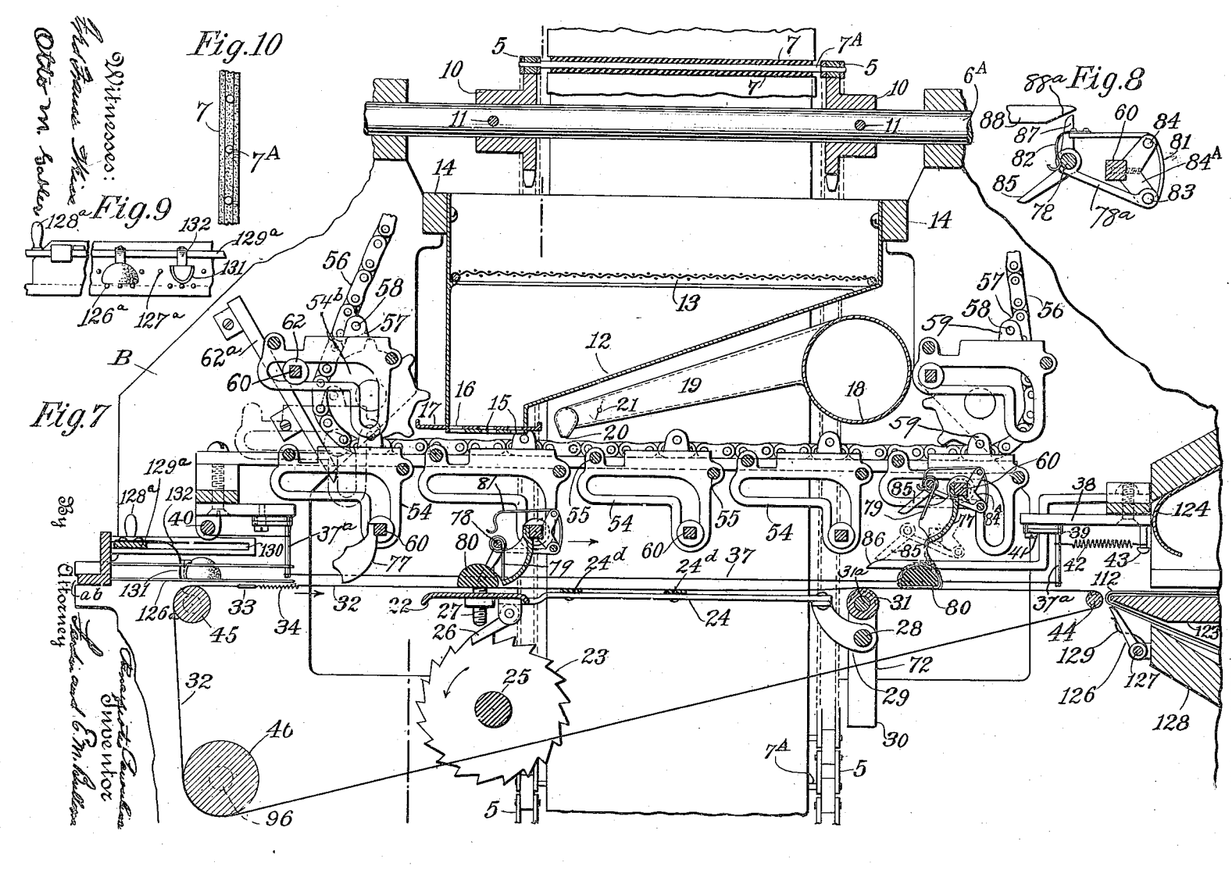
Fig. 7 is a view of the coating, agitating and stroking or decorating mechanism.
Fig. 8 is an enlarged view of the mechanism for opening and closing the blades which contain additional coating material for stroking or decorating.
Fig. 9 is an end view of the feeding bar.
Fig. 10 is a section of the coating material conveyer.
Figure 12:
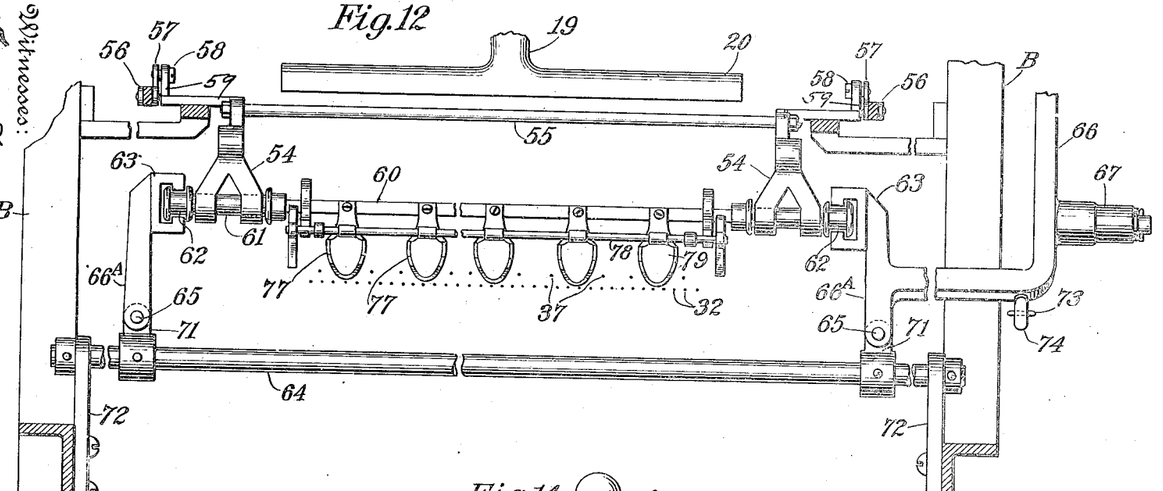
Fig. 12 is a front elevation showing the stroking or decorating mechanism, its operating means and the blasting means.
Figure 13:
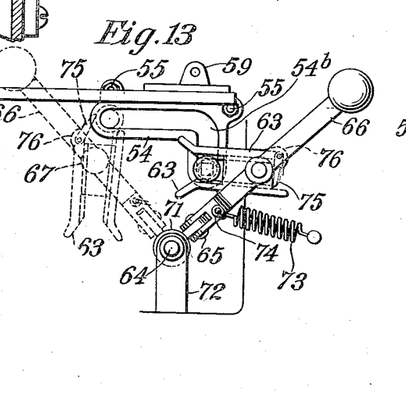
Fig. 13 is an enlarged view of the operating means of the stroking or decorating mechanism shown on Fig. 1.
Figure 14:
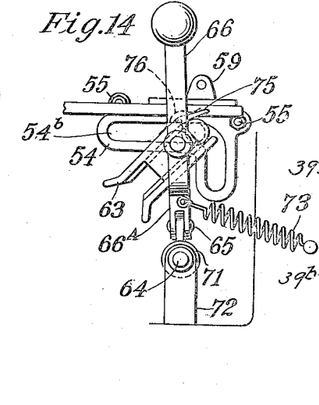
Fig. 14 is an enlarged view of the operating means of the stroking or decorating mechanism shown on Fig. 1 in the position when the stroke or decoration is about to be made.

While this operation is being performed the handle 66 may be either manually, or mechanically or automatically moved sidewise in any desired direction, and the spoons 77 will follow such direction and carry the string of coating material over the core in the design desired, which is a principal object of this invention. The handle 66 may also be moved sidewise manually, mechanically or automatically without regard to the cam 68. In order to return the cam guides 63—63 which are fastened on the bar 66$^a$—66$^a$ to their proper position to receive another bar 60 carrying spoons 77 to perform the stroking or decorating operation on another row of cores, I provide a spring 73, attached to the handle 66 as shown on Figs. 12 and 13 by a projection 74. It will be understood that this spring normally holds the handle against a suitable stop. To prevent bar 60, carrying the spoons 77, from returning to the cam guides 63—63 before the guide frames are carried upward on the chains 56—56, I provide a hinged dog 75 which is pressed by a spring 76. The bars 60 may be automatically returned to the bottom of the slots 64$^b$ in any suitable manner. In this instance, I have shown one desirable form, which comprises an inclined cam-bar 62$^a$ disposed substantially above the point where the cores 80 are moved onto the core-support 32, and adjacent the chains 56—56 at the lowest point in the descent thereof, as shown in Fig. 7. As the chains 56—56 approach the lowest point in the descent thereof, the pulleys 62, or the rollers 61, successively engage the cam-bar 62$^a$, and the bars 60 are thereby successively and automatically returned to their lowest position in the cam-slots 54$^b$. From this point onward through the horizontal working stretch the brackets 54 are held against swinging movement on the chains 56 by means of straight tracks 62$^b$, on which the extensions 59 slide in the manner shown in Fig. 12.

For the purpose of holding additional coating material for use when desired in the stroking or decorating of the cores 80, I provide bars 78 for holding plates 79. In the normal position of these plates, they are in vertical engagement with the spoons 77, and constitute movable gates for holding coating material within the spoons 77. The material is supplied to said spoons when, in the travel thereof, they come under the discharge-mouth of the trough 12, a portion of the coating material falling through the perforated bottom thereof falling into said spoons, and a portion on the cores 80, as will be understood by glancing at Fig. 7. The bar 60 carries, preferably toward each end thereof, forked members 84ª (see more particularly Fig. 8). To the free end of one of the forks of each member one end of an arm 78ª is pivoted, as at 83, the other end whereof is rigidly secured to the bar 78. To the free end of the other fork of said member 84ª is secured a pin 84. A spring 81 is carried by each of the forked members 84ª, in proximity to the pins 83, 84, and the curved extension of said spring is engageable with the bar 78 to hold the same in elevated position, with the gates 79 open. The bar 78 is provided, preferably at one or both ends thereof, with a depending, inclined finger 85, and with an upward-projecting finger 87. Arranged in the path of movement of the finger 85 is a stationary tripper 86 disposed toward the end of the lower horizontal travel of the chains 56, 56 (see Fig. 7). The tripper is, in this instance, as shown, in the form of a horizontally-disposed pin. As the spoons 77 commence their horizontal travel directly over the core-support or bed 32, the bars 78 are disengaged from the spring-extensions 82, as shown toward the left-hand end of Fig. 7, and remain in such position until, in the course of their travel, they contact with the tripper 86, which rocks the arm 78ª on its pivot 83, thus opening the gates 79, and simultaneously raises the bars 78 into locking engagement with the spring-extensions 82, as shown toward the right-hand end of Fig. 7. Arranged in the path of travel of the finger 87, near the top of the machine, is a stationary tripper 88, having a beveled end 88ª. It will be obvious that, when the finger 87 rides into engagement with the beveled end 88ª of the tripper 88, in the travel of the bar 78, as propelled by the chains 56—56, said beveled end 88ª will force the bars 78 out of engagement with the spring-extensions 82, whereupon the bars 78 drop, by gravity, into vertical engagement with the spoons 77. 89 is a cam having a roller 90 fastened on the cam 68 by a screw 91 in a slot 92. 93 are four arms fastened on shaft 94 to be operated by the cam 89. In this way the core support and the chain of the stroking devices are driven in a step-by-step manner.

Figures 1, 2, 3, 4:
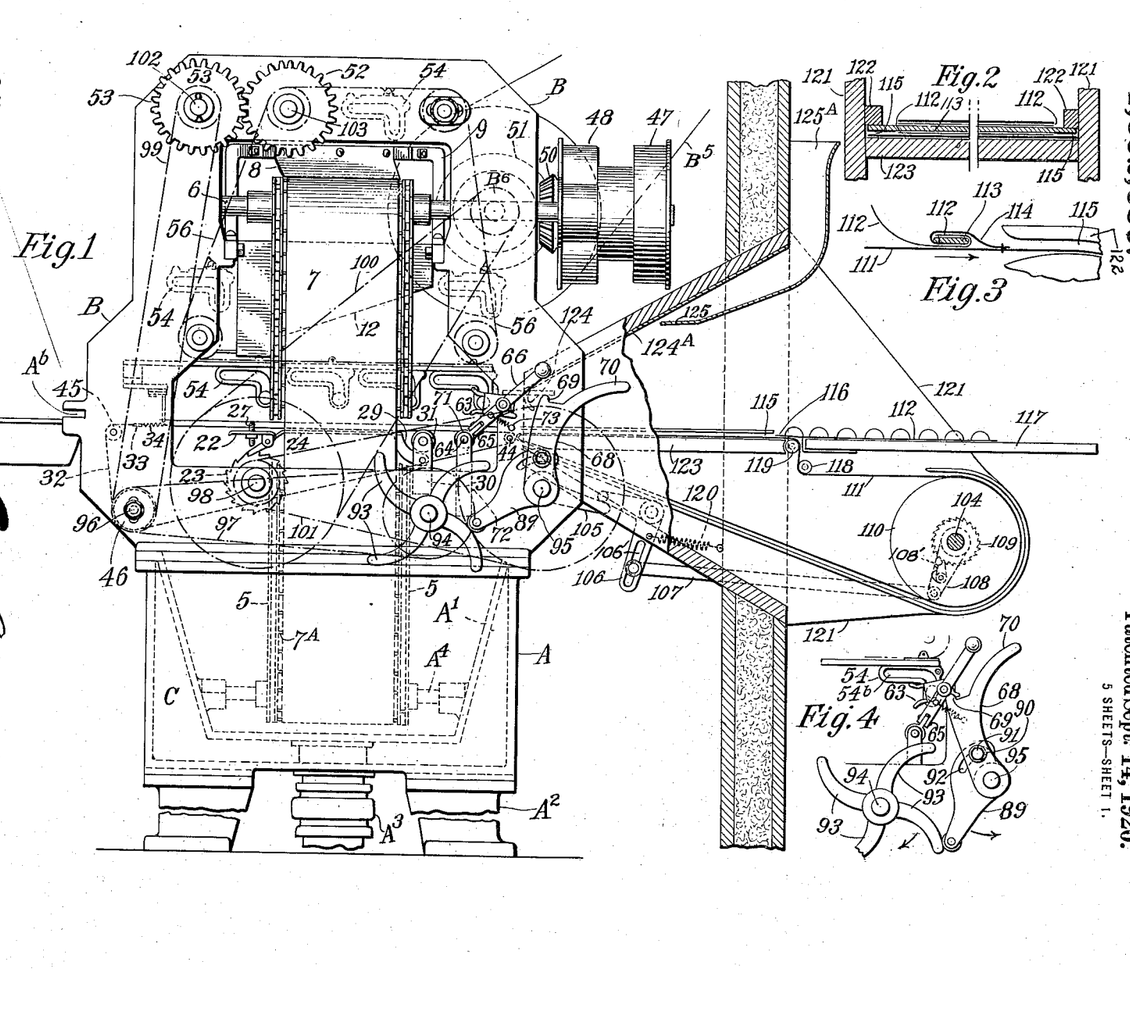
Figure 1, is an end view of my specific form of machine ready for operation.
Fig. 2, is a front elevation of the clamp for paper or other substance upon which the goods are delivered.
Fig. 3, is an end elevation of the clamp for paper or other substance upon which the goods are delivered.
Fig. 4, is a separate view of the mechanism for operating the core support and the stroking or decorating device shown on Fig. 1.

The machine is represented as driven by a belt B⁵, which is engageable with loose and fast pulleys B² and B⁴, the shaft of which is journaled in a bearing B³. This shaft bears a sprocket wheel B⁶ and a bevel gear 51. The sprocket wheel B⁶ drives a sprocket chain 100, which in turn drives a sprocket wheel B⁷ fast on the shaft 25. Another sprocket wheel B⁸ on the said shaft 25 drives a chain 101, which in turn drives a sprocket wheel B⁹ fast on the shaft 95 which carries the cams 68 and 89. The cam 89, as heretofore explained, operates the arms 93 on the shaft 94. In this way intermittent movement is imparted to a chain 97 which passes around a sprocket wheel on this shaft and another sprocket wheel on the shaft 96, which carries the drive roller 46 of the traveling core support 32. Another sprocket wheel on the shaft 96 drives a chain 99, which passes upward over a sprocket wheel on the shaft 102. This shaft has gears 53 fixed thereon and meshing with gears 52, which latter are fixed on shafts 103, which drive the chains 56 of the stroking mechanism. The bevel gear 51 heretofore referred to meshes with another bevel gear 50, which is united with a stepped pulley 48. A belt 49 connects this pulley with another stepped pulley 47, which is fast on the shaft 6 of the material-carrying belt 7. 104 is a shaft carrying fast thereon a roller 110 provided with a ratchet 109. Loosely mounted on the shaft 104 is an arm 108 carrying a pawl 108' engaging the ratchet 109. Pivotally connected with one end of the arm 108 is one end of a pitman 107, pivoted at the opposite end to a bell crank lever 106, which is adapted to be actuated by an arm 105 on the shaft 95. The connection between the pitman 107 and the bell crank lever is made adjustable by means of a slot, as indicated in Fig. 1, so that the throw of the pawl 108' may be varied.

The roller 110 moves the endless delivery apron 111, carrying sheets of paper or other suitable material on which the cores are delivered after the stroking or decorating operation. 113 is a bar fastened on the endless delivery apron 111 by flexible material 114 which bar 113 clasps the paper or other suitable material 112 between the flexible material 114 and presses it against the delivery apron 111 passing through a guide 115, and releases the same at the end 116 of the guide 115 so that the bar loosened from the guide will unfold the paper leaving the same on the table with the cores upon it and that the paper with the cores may be removed on to the plaque or table 117, leaving the delivery apron, from which the paper or other suitable material with the coated cores is released, to pass over the rollers 118 and 119 under the plaque or table 117. 120 is a spring which keeps the ratchet 108 always ready for another revolution. 121 is the side frame of the delivery apron mechanism. 122 is the bar which in conjunction with a table 123 forms the guide 115. 123 is the table over which the delivery apron travels and which is fastened to the sides 121—121.

126 is a metal bar hinged on the bar 127 which is fastened on the frame 128 and is pressed by a spring 129 against the paper 112 to keep the paper close to the table 123 while it is traveling along the delivery apron 111.

126ª are pin bars. 127ª are pin bars placed in a plane above the pin bars 126ª and form the support for the cores on the feeding device shown in Figs. 7 and 9. 128ᵃ is a handle attached to the bar 129ᵃ from which the pushers 131 are flexibly suspended by the springs 132.

124 is a curved metal deflector which guides cold air in the direction the candies are traveling on the delivery apron and prevents it from passing on to the core support where the stroking or decorating mechanism is being operated. 124ᵃ is the metal sheet which ends in the curve 124. 125 is a metal sheet which ends in a narrow opening and guides the air along the metal sheet 124ᵃ to the curve 124. 125ᵃ is the opening by means of which the air enters.

In operation the machine is placed in the position shown in Fig. 1 with the feeding device shown in Fig. 9 placed at the forward end of the machine as shown in Figs. 5 and 7. The cores having been placed on the pin bars 126ᵃ between the pin bars 127ᵃ are projected on to the core support 32 by pushing the handles 128ᵃ—128ᵃ forward thus causing the bar 129ᵃ in the slot 130 to move forward with the flexibly suspended pushers 131 connected to the bar 129ᵃ by the springs 132; and are pushed against the spoons or mechanical thumbs 77 which are held in position in the guide frame 54—54 at the forward end of the core support 32. Power having been applied to the machine and the coating material tank A¹ having been filled with coating material of the proper consistency, the cam 89 revolves the cams 93 which are fastened on the shaft 94 causing approximately a one-half revolution of the shaft 96, and the shaft 102 which in turn revolve the gear 52—52 and cause a one-half revolution of the shaft 103—103 which moves the spoons or mechanical thumbs 77 from the position at the forward end of the core support 32 under or slightly past the flow of coating material falling from the hopper 12 at the same time moving the core support 32 with the same or a little greater speed in the same direction. This movement serves to bring the row of cores under the downward flow of chocolate by which they are coated. By making the roller 46 a little larger, the speed of the core support 32 may be increased as desired. By making the speed of the core support slightly greater than the speed at which the stroking devices are driven, a contact between the cores and stroking devices is insured throughout their travel together, including the period of coating and extending up to the time when the stroking devices are raised to draw the decorating strings from the coating course. The cams 93 are again revolved by the cam 89 and the same operation is performed on another descending row of spoons or mechanical thumbs 77 and at the same time the row which had passed under the flow of coating material is carried farther and under the blast from the opening 20 of the shaft 19 of the blower, the core support 32 moving in the same direction at the same time. The movement of the spoons or mechanical thumbs 77 carried by their guides 54—54 on the chains 56—56 is intermittent during the operation of the machine as is also the simultaneous movement of the core support 32.

The chains 5—5 carrying the coating material conveyer 7 supported by the rods 7ᵃ are in motion by the revolution over the shaft 6 which is revolved by the pulleys 47 and 48 and by the bevel gears 50 and 51 and by the belt 49 as shown on Fig. 5. The revolution of the chains 5—5 continuously conveys coating material from the tank A¹ between the scrapers 8—8 from which it falls into the hopper 12 through the screen 13, and is then distributed over the cores through the openings 15 and 16. While the same is being distributed over the cores the shaft 25 is revolving the ratchet 23 forcing the dog 26 against the screw 27 fastened to the plate 22 at the end of the agitator arm 24 causing it to agitate and force the coating material against the bottom of the core 80 and at the same time causing the core support 32 to agitate from the roller 45 to the roller 31 which stops the agitation between it and the roller 44. By removing the bars 24ᵈ 24ᵃ the agitation of the core support 32 is prevented without interfering with the mechanism for coating the bottoms of the core. When agitation of the core support 32 is thus prevented it may be supplied by means of the blasts from the opening 20 of the shaft 19 of the blower against the intermittent plates 36 at the sides of the core support 32 as shown on Fig. 5. After the successive rows of cores have been coated and agitated and have passed the roller 31 they come into the position shown in Fig. 7. The shaft 95 is revolved by the chain 100 passing over the sprocket fastened on the shaft 98 and causes the cam 68 to revolve and strike the roller 67 shown on Fig. 12. This presses the handle 66 upward, which in turn forces the bar 60 carrying the spoons or mechanical thumbs 77 through the guide slot 54ᵇ. The spoons or mechanical thumbs 77 having been in contact with the coated cores will draw from each of the coated cores a string of the coating material, which breaks and falls back upon the candy. If the guide slot 54ᵇ is shaped to draw them vertically only, the string will follow the vertical travel and form the decoration upon the core as the core travels horizontally thereunder. When a stroke or decoration is desired in some particular design mechanism may be connected with the handle 66 on the pivot 65 to move it sidewise through the guide slot 54ᵇ in any direction so as to carry the spoons 77 and draw the string in that direction and form the desired design. To make a heavier or stronger stroke or decoration the plates 79 are provided to contain additional coating material and to discharge the same when the stroke or decoration is being made. The additional coating material is supplied from the hopper 12. These plates 79 are operated by means of the cam 85 which opens them and the cam 87 which closes them at the proper time. After the cores have been stroked or decorated they pass from the core support 32 to the delivery apron 111 on paper or other suitable material 112 over the plaque or table 123, until they come to the opening 116 of the guide 115 where the bar 113 is opened and the paper or other material 112 passes to the table or plaque 117, leaving the delivery apron 111 to pass around the rollers 119 and 118 and around the roller 110. The delivery belt is moved by the roller 110 which is revolved by the pawl 108 and the ratchet 109 and by the cam 105 and the bell crank 106 which are adjusted to work in unison with the stroking or decorating mechanism and the core support 32, thus causing the cores to be evenly and compactly deposited and discharged.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As ay changes could be made in the above construction, and many apparently widely different embodiments of the invention could be made without departing from the scope thereof, it is intended that all matter contained in the above description or shown in the accompanying drawings shall be interpreted in an illustrative and not in a limiting sense.

It is furthermore desired to be understood that the language used in the following claims is intended to cover all the generic and specific features of the invention herein described, and all statements of the scope of the invention which as a matter of language might be said to fall therebetween.

I claim as my invention:

1. A machine for coating and decorating candy cores comprising, in combination, a traveling core support, means thereover for supplying coating material to the cores, and a contacting stroking device also over said support and operative upon the freshly-coated cores while the latter remain upon the support.

2. A machine for coating and decorating candy cores comprising, in combination, a receptacle for delivering a downward flow of coating material, an endless belt core support arranged to travel therebeneath, and a contacting stroking device comprising individual contacting portions adapted to operate upon the freshly-coated cores at a further stage in the travel of the said support.

3. A machine for coating and decorating candy cores comprising, in combination, coating means adapted to deliver a downward flow of coating material, stroking means, traveling core supporting means in operative relation to said coating and stroking means, and means for advancing while the latter remain upon their supporting means.

4. A machine for coating and decorating candy cores comprising, in combination, means for delivering a downward flow of coating material, core - conveying means, stroking devices adapted to contact with the coated cores on said core conveying means and to draw from each a string of coating material, and means for automatically removing said stroking devices from the coated cores while the latter remain on the core-conveying means, to perform the stroke.

5. A machine for coating and decorating candy cores comprising, in combination, coating means adapted to deliver a downward flow of coating material over the cores, a substantially horizontally traveling conveyer, stroking means comprising individual contacting means adapted to contact with the coated cores on said conveyer, and mechanism for moving said stroking means upward from the coated cores on said conveyer while the latter remain.

6. A machine for coating and decorating candy cores comprising, in combination, coating means adapted to deliver a downward flow of coating material over the cores, a substantially horizontally traveling conveyer, a stroking device adapted to contact with the coated cores on the conveyer, and mechanism for moving said stroking device upward from the coated cores on said conveyer, said mechanism being also constructed to move said device in an elevated path across the cores while the latter remain on the conveyer.

7. A machine for coating and decorating candy cores comprising, in combination, endless traveling conveying means, means for delivering a downward flow of coating material over cores carried by said conveyer, stroking means comprising a transverse row of devices adapted to contact with the freshly coated cores in order to draw from each an attached string and to contain additional coating material to enter said strings, and means for operating said stroking means to perform the stroke while the coated cores remain on the conveying means.

8. In candy decorating apparatus, the combination of a conveyer adapted to carry coated cores, a stroking device comprising individual contacting portions adapted to contact with the coated cores on said conveyer, and mechanism for moving said stroking device upward from the cores while remaining on the conveyer in order to draw from each an attached string.

9. In candy decorating apparatus, the combination of a conveyer adapted to carry coated cores, a stroking device comprising individual contacting portions adapted to contact with the coated cores on said conveyer, and mechanism for moving said stroking device upward from the cores while remaining on the conveyer and also across the same in order to draw from each an attached string.

10. In candy decorating apparatus, an endless support for the pieces to be decorated, stroking means adapted to contact with the pieces on the said support and to be moved upward to draw therefrom attached strings of coating material, and driving means for said support adapted to advance the same step by step.

11. A machine for coating and decorating candy cores, comprising an endless conveyer for the cores, means for supplying a downward flow of coating material thereover, and means for agitating the conveyer in a portion of its working stretch comprising the region where the coating is accomplished, in combination with means operative to decorate the coated cores at another region, and means for preventing vibration of the conveyer at the latter region.

12. A machine for coating and decorating candy cores, comprising an endless conveyer for the cores, means for supplying a downward flow of coating material thereover, and means for agitating the conveyer in a portion of its working stretch comprising the region where the coating is accomplished, in combination with stroking means adapted to contact with the coated cores, mechanism for moving the stroking means upward from the coated cores in order to draw from each an attached string of the coating material to be deposited over the top thereof, and means for holding the conveyer against vibration where this action takes place.

13. Candy decorating apparatus comprising a contacting stroking device adapted to hold additional coating material, combined with mechanism for jarring said device at the time of the stroke.

14. Candy decorating apparatus comprising spoons adapted to contact with the coated cores and to hold additional material for the attached strings which are drawn from and over the cores, and means for jarring or vibrating the spoons while performing their function in order to insure the descent of the additional coating material to prolong the strings.

15. In candy decorating apparatus, the combination with contacting stroking spoons adapted to hold additional coating material to form the decorations, and a conveyer for the coated cores, of means for jarring or vibrating said spoons during the formation of the decorations so as to insure long strings.

16. Candy decorating apparatus, comprising a conveyer, stroking means comprising a transverse row of individual stroking members, and means for guiding pieces on the conveyer in relation to the stroking means.

17. A machine for coating and decorating candy cores, comprising means for delivering a downward flow of coating material, traveling core supporting means, stroking means, and means for laterally guiding the cores through the flow and while being stroked.

18. In candy decorating apparatus, the combination of a traveling support for the pieces to be decorated, stroking devices, and mechanism for causing said stroking devices to travel in a circuit, one portion of which is above and parallel with the travel of the pieces on the conveyer.

19. In candy decorating apparatus, the combination of an endless support for the pieces to be decorated, an endless series of stroking devices, and means for driving said support and series of stroking devices substantially in unison and with their working stretches in parallelism.

20. In candy decorating apparatus, the combination of an endless support for the pieces to be decorated, an endless chain of stroking devices arranged to travel over and with the working stretch of the conveyer, and suitable means for driving the conveyer and chain of stroking devices.

21. In candy decorating apparatus, the combination with a support for the pieces to be decorated and means for producing an advancing movement of the support, of an endless chain of stroking devices and means for driving the same through a working stretch in the same direction as the advancing movement of the said support.

22. In candy decorating apparatus, the combination of an endless support for the pieces to be decorated, an endless series of stroking devices, and mechanism for driving said support and series of stroking devices intermittently and substantially in unison.

23. In candy decorating apparatus, the combination of an endless driven support for the pieces to be decorated, an endless series of stroking devices, and means for causing said stroking devices to advance in contact with the pieces on the conveyer.

24. In candy decorating apparatus, the combination of an endless carrier, a series of stroking devices thereon, means for driving said carrier, and means for moving said stroking devices relatively to the carrier to produce the stroke.

25. In candy decorating apparatus, the combination of a support for the pieces to be decorated, means for producing an advancing movement of the same, a stroking device, and mechanism for advancing said device in contact with the pieces on the support in the same direction as the support and thereafter separating the same from the pieces to draw the strings therefrom.

26. In a machine for coating and decorating candy cores, the combination of a core support, means for advancing the same, means for delivering a downward flow of coating material over cores on said support, a stroking device adapted to hold additional coating material, and means for passing said device beneath the coating flow.

27. In a machine for coating and decorating confectionery cores, a traveling core support, means for supplying a downward flow of coating material over cores on said support, and decorating means adapted to travel with the core support and to contact with the cores during the coating thereof.

28. In a machine for coating and decorating confectionery cores, a core support, means for delivering a downward flow of coating material over cores on the support, a stroking device adapted to contact with the cores in the flow, means for advancing the core support and the stroking device from the flow with the stroking device maintained in contact with the cores until raised to produce the stroke.

29. In a machine for coating and decorating confectionery-cores, core-supporting means traveling along a linear path, and core-decorating means also traversing a linear path and moving in the same direction as the core-supporting means.

30. In a machine for coating and decorating confectionery-cores, core supporting means traveling along a linear path, and core-decorating means contacting with the cores on the core-supporting means, and also traversing a linear path and moving in the same direction as the core-supporting means.

31. In a machine for coating and decorating confectionery-cores, core-supporting means traveling along a linear path, and core-decorating means also traversing a linear path and moving in the same direction as the core-supporting means, and operable to draw a string of coating material up over the cores on said core-supporting means.

32. In a machine for coating and decorating confectionery-cores, core-supporting means traveling along a linear path, core-decorating means also traversing a linear path and moving in the same direction as the core-supporting means, and means automatically operable, at a predetermined point in the travel of said core-decorating-means, to cause the same to draw a string of coating material up over the cores on said core-supporting means.

33. In a machine for coating confectionery-cores, traveling core-supporting means, and a vibratory device having a part adapted to press the coating material up under the cores and a part adapted to agitate the core support, the latter part being adapted to be placed out of action.

34. In a machine for coating confectionery-cores, traveling core-supporting means, and combined means for pressing the coating-material up under the cores during the coating operation and for vibrating said core-supporting means, comprising: arms extending longitudinally of said core-supporting means and carrying, at their ends, a bottoming plate extending transversely of said core-supporting-means, and removable bars carried by said arms and extending transversely beneath said core-supporting means.

35. In a machine for coating and decorating confectionery-cores, traveling core-supporting means, core-decorating means traversing a linear path and moving in the same direction as the core-supporting means, agitating means affecting a limited area or section of said core-supporting means, means for supplying coating-material to said cores while traveling on the agitated section of said core-supporting means, and means actuating the core-decorating means, while the cores are on the non-vibratory or non-agitated section of said core-supporting means, to cause them to perform the core-decorating operation.

36. In a machine for coating and decorating confectionery-cores, traveling core-supporting means, core-decorating means traversing a linear path and moving in the same direction as the core-supporting means and contacting with the cores on the latter, agitating means affecting a limited area or section of said core-supporting means, means for applying coating-material to said cores while traveling on the agitated section of said core-supporting means, and means actuating the core-decorating means, while the cores are on the non-vibratory or non-agitated section of said core-supporting means, to cause them to perform the core-decorating operation.

37. In a machine for coating and decorating confectionery-cores, core-supporting means traveling along a linear path, core-decorating means also traversing a linear path and moving in the same direction as the core-supporting means and contacting with the cores thereon, and means operable, at a predetermined point in the travel of said core-decorating and contacting means, to raise the latter initially upward and then horizontally, to effect the core-decorating operation.

38. In a machine for coating and decorating confectionery-cores, core-supporting means traveling along a linear path, core-decorating means also traversing a linear path and moving in the same direction as the core-supporting means and contacting with the cores thereon, means operable, at a predetermined point in the travel of said core-decorating and contacting means, to raise the latter initially upward and then horizontally, to effect the core-decorating operation, and automatic means for returning said core-decorating and contacting means to their original position after movement thereof to effect the core-decorating operation.

39. In a machine for coating and decorating confectionery-cores, core-supporting means traveling along a linear path, means for supplying coating material to the cores on the core-supporting means, and core-decorating means traversing a linear path and moving in the same direction as the core-supporting means and shaped to hold additional coating material.

40. In a machine for coating and decorating confectionery-cores, core-supporting means traveling along a linear path, means for supplying coating material to the cores on the core-supporting means, and core-decorating means traversing a linear path and moving in the same direction as the core-supporting means and shaped to hold additional coating material, and including movable gates, which, when opened, dump said additional coating material.

41. In a machine for coating and decorating confectionery-cores, core-supporting means traveling along a linear path, means for supplying coating material to the cores on the core-supporting means, core-decorating means traversing a linear path and moving in the same direction as the core-supporting means and shaped to hold additional coating material, and including movable gates, which, when opened, dump said additional coating material; and means for automatically opening said gates at predetermined intervals.

42. In a machine for coating and decorating confectionery-cores, core-supporting means traveling along a linear path, means for supplying coating material to the cores on the core-supporting means, core-decorating means traversing a linear path and moving in the same direction as the core-supporting means and shaped to hold additional coating material, and including movable gates, which, when opened, dump said additional coating material; and means for automatically opening and closing said gates at predetermined intervals.

43. In a machine for coating confectionery cores, a flexible support for the cores carrying longitudinally thereof a series of spaced plates, and means for directing an air-blast on said plates, successively, to cause vibration or agitation of said core-support.

44. In a machine for coating confectionery cores, a flexible support for the cores carrying, longitudinally thereof, a series of spaced, imperforate members, and means for directing an air-blast on said members, successively, to cause vibration or agitation of said core-support.

45. In a machine for coating and decorating confectionery-cores, a traveling core-support, guiding-wires for the cores on said core-support, said guiding-wires being disposed longitudinally of said core-support, at the sides thereof, and being adjustable toward and away from each other, and means for effecting simultaneous adjustment of said wires.

46. In a machine for decorating and coating confectionery-cores, core-supporting means traversing a linear path, core-decorating means also traversing a linear path and in the same direction as said core-supporting means, and automatic means for causing said core-decorating means, at a predetermined point in their travel, to ride up, over and across the cores on said core-supporting means, to effect decoration of said cores, said automatic means permitting the core-decorating means to be moved, in said decorating operation, in any direction, horizontally.

47. In a machine for decorating and coating confectionery-cores, core-supporting means traversing a linear path, and core-decorating means also traversing a linear path and moving in the same direction as said core-supporting means, said core-decorating means comprising spoon-shaped core-contacting members.

48. In a machine for decorating and coating confectionery-cores, core-supporting means traversing a linear path, and core-decorating means also traversing a linear path and moving in the same direction as said core-supporting means, said core-decorating means comprising an endless series of spoon-shaped core-contacting members.

49. In a machine for coating and decorating confectionery-cores, traveling core-supporting means; core-decorating members traveling with the cores on the core-supporting means; shafts from which said members are suspended; and supporting brackets having cam guide-slots in which said shafts are movable.

50. In a machine for coating and decorating confectionery-cores, traveling core-supporting means; core-decorating members traveling with the cores on the core-supporting means; shafts from which said members are suspended; supporting-brackets having cam guide-slots in which said shafts are movable; and endless chains carrying said brackets.

51. In a machine for coating and decorating confectionery-cores, traveling core-supporting means; core-decorating members traveling with the cores on the core-supporting means; shafts from which said members are suspended; supporting-brackets having cam guide-slots in which said shafts are movable; and means for automatically moving said shafts in said guide cam-slots at a predetermined period in the travel of said members.

52. In a machine for coating and decorating confectionery-cores, core-supporting means traversing a linear path, core-decorating means including gates also traversing a linear path and moving in the same direction as the core-supporting means and shaped to hold additional coating material, said gates when closed, preventing dumping of said additional coating material, movable members supporting said gates, a finger carried by said members, and tripping means arranged in the path of movement of said finger and contacting therewith, at a predetermined point in the travel of said core-decorating means, to open said gates.

53. In a machine for coating and decorating confectionery-cores, core-supporting means traversing a linear path, core-decorating means including gates also traversing a linear path and moving in the same direction as the core-supporting means and shaped to hold additional coating material, said gates when closed, preventing dumping of said additional coating material, movable members supporting said gates, a finger carried by said members, tripping means arranged in the path of movement of said finger and contacting therewith, at a predetermined point in the travel of said core-decorating means, to open said gates, a second finger carried by said members, and a second tripping means arranged in the path of movement of said second finger and contacting therewith, at a predetermined point in the travel of said core-decorating means, to close said gates.

54. In a machine for coating and decorating confectionery-cores, traveling core-supporting means; an endless series of core-decorating members; shafts carrying said members; supporting-brackets for said shafts having cam-slots engaged by said shafts; endless traveling chains carrying said brackets; and means for causing said shafts to move in said cam-slots to effect decoration of the cores, comprising; cam-means disposed in the path of movement of said shafts and provided with cam-ways through which said shafts pass, at a predetermined point in their travel, and means for automatically actuating said cam-means, while the shafts are traveling through the cam-ways thereof, whereby to move the shafts in the said cam-slots of said supporting-brackets.

55. In a machine for coating and decorating confectionery-cores, traveling core-supporting means; an endless series of core-decorating members; shafts carrying said members; supporting-brackets for said shafts having cam-slots engaged by said shafts; endless traveling chains carrying said brackets; and means for causing said shafts to move in said cam-slots to effect decoration of the cores, comprising: pivoted cam-means disposed in the path of movement of said shafts and provided with cam-ways through which said shafts pass, at a predetermined point in their travel, and means for automatically actuating said cam-means, while the shafts are traveling through the cam-ways thereof, whereby to move the shafts in the said cam-slots of said supporting-brackets.

56. In a machine for coating and decorating confectionery-cores, traveling core-supporting means; an endless series of core-decorating members; shafts carrying said members; supporting-brackets for said shafts having cam-slots engaged by said shafts; endless traveling chains carrying said brackets; means for causing said shafts to move in said cam-slots to effect decoration of the cores, comprising cam-means disposed in the path of movement of said shafts and provided with cam-ways through which said shafts pass, at a predetermined point in their travel, and means for automatically actuating said cam-means, while the shafts are traveling through the cam-ways thereof, whereby to move the shafts in the said cam-slots of said supporting-brackets; and means for automatically returning said cam-means to primary position after actuation thereof.

57. In a machine for coating and decorating confectionery-cores, traveling core-supporting means; an endless series of core-decorating members; shafts carrying said members; supporting-brackets for said shafts having cam-slots engaged by said shafts; endless traveling chains carrying said brackets; and means for causing said shafts to move in said cam-slots to effect decoration of the cores, comprising: pivoted members disposed in the path of movement of said shafts and provided with cam-ways, through which said shafts pass at a predetermined point in their travel, and means for automatically actuating said pivoted members, while the shafts are traveling through the cam-ways thereof.

58. In a machine for coating and decorating confectionery-cores, traveling core-supporting means; an endless series of core-decorating members; shafts carrying said members; supporting-brackets for said shafts having cam-slots engaged by said shafts; endless traveling chains carrying said brackets; and means for causing said shafts to move in said cam-slots to effect decoration of the cores, comprising: pivoted members disposed in the path of movement of said shafts and provided with cam-ways, through which said shafts pass at a predetermined point in their travel, a shaft on which said pivoted members are carried, and means for automatically actuating said pivoted members, while the first-mentioned shafts are traveling through the cam-ways thereof.

59. In a machine for coating and decorating confectionery-cores, traveling core-supporting means; an endless series of core-decorating members; shafts carrying said members; supporting-brackets for said shafts having cam-slots engaged by said shafts; endless traveling chains carrying said brackets; and means for causing said shafts to move in said cam-slots to effect decoration of the cores, comprising: pivoted members disposed in the path of movement of said shafts and provided with cam-ways, through which said shafts pass at a predetermined point in their travel, and means for automatically actuating said pivoted members, while said first-mentioned shafts are traveling through the cam-ways thereof.

60. In a machine for coating and decorating confectionery-cores, traveling core-supporting means; an endless series of core-decorating members; shafts carrying said members; supporting-brackets for said shafts having cam-slots engaged by said shafts; endless traveling chains carrying said brackets; means for causing said shafts to move in said cam-slots to effect decoration of the cores, comprising pivoted members disposed in the path of movement of said shafts and provided with cam-ways, through which said shafts pass at a predetermined point in their travel, and means for automatically actuating said pivoted members, while the shafts are traveling through the cam-ways thereof; and means connected with said pivoted members whereby the same may be manually actuated, irrespective of said automatically-actuating means therefor.

61. The combination of a conveyer for the articles to be coated, a tank adapted to contain a coating material, located above said conveyer and provided with an outlet, and spoons adapted to contact with coated articles upon the conveyer and to receive the coating material from said tank and to deliver it upon the articles as a decoration originating in the coatings thereon.

62. The combination of a conveyer for the articles to be coated, a tank adapted to contain a coating material, movable spoons for transferring the coating material from the said tank to the articles carried by the conveyer, and means for jolting the spoons during such transfer movement.

63. The combination of a conveyer for the articles to be coated, means for supporting said conveyer at the ends of its operative portion, means for discharging a coating material upon said articles, mechanism for vibrating the conveyer at the point where said material is applied, and means for arresting the vibration at a point of the conveyer between the vibrating mechanism and the farther one of said end supports.

64. The combination of a conveyer for the articles to be coated, supports engaging said conveyer at the ends of its operative portion, means for discharging a coating material upon said articles, mechanism engaging the conveyer from below, for imparting a vibrating motion to that portion at which the coating material is supplied, and means for arresting the vibration at a point of the conveyer between the vibrating mechanism and the farther one of the said end supports.

65. The combination of an apertured conveyer for the articles to be coated, means for discharging a coating material upon said articles, a bottoming bar arranged immediately below the conveyer at the point where such material is supplied, another bar arranged to engage the conveyer in advance of said bottoming bar, and means for imparting a jolting motion to both bars.

66. The combination of an apertured conveyer for the articles to be coated, supports engaging said conveyer at the ends of its operative portion, means for discharging a coating material upon said articles, a bottoming bar arranged immediately below the conveyer at the point where such material is supplied, means for jolting said bar and the conveyer, and means for arresting the jolting vibration of the conveyer at a point between the jolting mechanism and one of said end supports.

67. The combination of a conveyer for the articles to be coated, a tank adapted to contain a coating material, located above said conveyer and provided with an outlet, and spoons movable toward the conveyer from a point adjacent to the tank outlet, said spoons being adapted to receive the coating material from said tank and to deliver it upon the articles carried by the conveyer.

68. The combination of a conveyer for the articles to be coated, a tank, located above the conveyer and adapted to contain a coating material, and spoons movable between the said tank and the conveyer, to carry the coating material from the tank to the articles on the conveyer.

69. The combination of a conveyer for the articles to be coated, a tank adapted to contain a coating material, a gate controlling an outlet from said tank, spoons movable between the tank and the conveyer, to carry the coating material discharged from said outlet, to the articles on the conveyer, and means for operating said gate and spoons.

70. The combination of a conveyer for the articles to be coated, movable members for discharging a coating material on the articles carried by the conveyer, and means for jolting said members.

Signed at the city of New York, in the county of New York and State of New York, on the 2nd day of August, in the year one thousand nine hundred and eleven.

PANAYIOTIS PANOULIAS.

Witnesses:
EMILIE M. BULLOWA,
FRED FRANCE WEISS.